(12) United States Patent
Yamamoto et al.

(10) Patent No.: US 11,174,943 B2
(45) Date of Patent: Nov. 16, 2021

(54) SEAL STRUCTURE

(71) Applicant: VALQUA, LTD., Tokyo (JP)

(72) Inventors: Takahiro Yamamoto, Machida (JP); Chao Jing, Tokyo (JP); Mitsuru Minami, Gojo (JP); Akira Ueda, Gojo (JP); Yuki Noriduki, Osaka (JP)

(73) Assignee: VALQUA, LTD., Tokyo (JP)

( * ) Notice: Subject to any disclaimer, the term of this patent is extended or adjusted under 35 U.S.C. 154(b) by 120 days.

(21) Appl. No.: 16/607,884

(22) PCT Filed: May 11, 2017

(86) PCT No.: PCT/JP2017/017884
§ 371 (c)(1),
(2) Date: Oct. 24, 2019

(87) PCT Pub. No.: WO2018/207314
PCT Pub. Date: Nov. 15, 2018

(65) Prior Publication Data
US 2020/0063870 A1   Feb. 27, 2020

(51) Int. Cl.
*F16J 15/16* (2006.01)
*F16J 15/3284* (2016.01)
*E21B 10/25* (2006.01)

(52) U.S. Cl.
CPC ........... *F16J 15/3284* (2013.01); *E21B 10/25* (2013.01)

(58) Field of Classification Search
CPC ...... F16J 15/3284; F16J 15/32; F16J 15/3204; F16J 15/3216; F16J 15/3232; F16J 15/3236; E21B 10/25
See application file for complete search history.

(56) References Cited

U.S. PATENT DOCUMENTS 4,627,332 A * 12/1986 Furuta ................... B60T 11/236
  277/562
4,781,024 A * 11/1988 Nakamura ............ B60T 11/236
  277/558
(Continued)

FOREIGN PATENT DOCUMENTS

CN   101332811 A   12/2008
CN   101629475 A    1/2010
(Continued)

OTHER PUBLICATIONS

Chinese Office Action dated Aug. 20, 2020, which issued in corresponding Patent Application No. 201780090561.7, including English translation.
International Search Report dated Aug. 15, 2017, which issued in corresponding PCT Patent Application No. PCT/JP2017/017884, including English translation.

*Primary Examiner* — Gilbert Y Lee
(74) *Attorney, Agent, or Firm* — Dickinson Wright PLLC (57) ABSTRACT

A seal structure includes a ring-shaped seal member. The seal member is disposed in a seal groove. The case includes a low-pressure lateral face in a cross section of the seal structure, the cross section being taken along an imaginary plane in parallel with a shaft axial direction of the shaft and passing through a center line of the shaft. The seal member includes a first protruding portion. The first protruding portion protrudes from a main portion having a bottom face in contact with the low-pressure lateral face, and has a shape such that the first protruding portion extends toward the shaft as the first protruding portion extends toward the low-pressure side. The first protruding portion includes a tip. The first protruding portion includes a contact region in contact with the shaft. The tip is closer to the low-pressure side than the contact region is.

2 Claims, 6 Drawing Sheets

(56) References Cited

U.S. PATENT DOCUMENTS

| | | | |
|---|---|---|---|
| 7,401,468 B2* | 7/2008 | Mouri | B60T 11/20 |
| | | | 60/588 |
| 7,937,940 B2* | 5/2011 | Gaffe | B60T 11/236 |
| | | | 60/588 |
| 9,663,085 B2* | 5/2017 | Tanabe | F16J 15/164 |
| 10,173,655 B2* | 1/2019 | Kim | B60T 11/232 |
| 10,300,900 B2* | 5/2019 | Mun | B60T 11/228 |
| 2006/0064978 A1 | 3/2006 | Mouri et al. | |
| 2008/0011518 A1 | 1/2008 | Zahradnik et al. | |
| 2008/0289329 A1 | 11/2008 | Gaffe et al. | |
| 2010/0066028 A1 | 3/2010 | Aoki et al. | |
| 2010/0156052 A1* | 6/2010 | Bernadat | B60T 11/236 |
| | | | 277/648 |
| 2012/0312602 A1 | 12/2012 | Zhang et al. | |
| 2015/0047338 A1 | 2/2015 | Tanabe et al. | |

FOREIGN PATENT DOCUMENTS

| | | |
|---|---|---|
| CN | 201786262 U | 4/2011 |
| CN | 102747961 A | 10/2012 |
| CN | 102747962 A | 10/2012 |
| CN | 104220311 A | 12/2014 |
| EP | 2172667 A1 | 4/2010 |
| JP | 2005036827 A | 2/2005 |
| JP | 2010084906 A | 4/2010 |
| JP | 2011196505 A | 10/2011 |
| JP | 2013071507 A | 4/2013 |
| JP | 2016075353 A | 5/2016 |
| WO | 2008054010 A1 | 5/2008 |

* cited by examiner

|  | EXAMPLE 1 | EXAMPLE 2 | EXAMPLE 3 | COMPARATIVE EXAMPLE 1 |
|---|---|---|---|---|
| W DIMENSION [mm] | 5.7 | ← | ← | ← |
| G DIMENSION [mm] | 6.7 | ← | ← | ← |
| D DIMENSION [mm] | 54.1 | 54.1 | 53.4 | 54.1 |
| X DIMENSION [mm] | 0.68 | 0.64 | 0.55 | 0.25 |
| ANGLE θ [°] | 50 | 48 | 50 | 47 |
| H DIMENSION | 6.2 | ← | ← | ← |
| HEAT GENERATION | ACCEPTABLE | ACCEPTABLE | EXCELLENT | IMPONDERABLE |
| WEAR RESISTANCE | ACCEPTABLE | ACCEPTABLE | EXCELLENT | IMPONDERABLE |
| SEALABILITY | EXCELLENT | EXCELLENT | EXCELLENT | POOR |
| LIFE | ACCEPTABLE | ACCEPTABLE | EXCELLENT | IMPONDERABLE |

SEAL STRUCTURE

TECHNICAL FIELD

The present invention relates to a seal structure provided between a bit attachment shaft and a bit in an excavator.

BACKGROUND ART

In excavators, techniques of prolonging the life of seal members for bits are disclosed in, for example, U.S. Patent Application Publication No. 20084011518 (PTL 1), U.S. Patent Application Publication No. 2012312602 (PTL 2). China Patent Application Publication No. 101629475 (PTL 3), China Patent Application Publication No. 102747961 (PTL 4), China Patent Application Publication No. 102747962 (PTL 5), and China Utility Model Publication No. 201786262 (PTL 6).

CITATION LIST

Patent Literature

PTL 1: U.S. Patent Application Publication No. 2008/011518
PTL 2: U.S. Patent Application Publication No. 2012/312602
PTL 3: China Patent Application Publication No. 101629475
PTL 4: China Patent Application Publication No. 102747961
PTL 5: China Patent Application Publication No. 102747962
PTL 6: China Utility Model Publication No. 201786262

SUMMARY OF INVENTION

Technical Problem

The seal structures disclosed in the above literatures improve the lubricating ability, the wear resistance and the like, thus prolonging the life of the seal members. However, there has been a demand for a longer life of seal members.

An object of the present invention is to provide a seal structure that can prolong the life of a seal member.

Solution to Problem

A seal structure according to the present invention includes a ring-shaped seal member. The seal member is disposed in a seal groove formed in a case at a sliding gap between a shaft and the case. The seal member separates a high-pressure side from a low-pressure side. The case includes a low-pressure lateral face and a groove bottom. The low-pressure lateral face constitutes a lateral face of the seal groove on the low-pressure side. The low-pressure lateral face extends along a direction orthogonal to a shaft axial direction of the shaft in a cross section of the seal structure, the cross section being taken along an imaginary plane in parallel with the shaft axial direction and passing through a center line of the shaft. The groove bottom constitutes a bottom face of the seal groove. The groove bottom extends along the shaft axial direction in the cross section. The seal member includes a main portion and a first protruding portion. The main portion includes a bottom face in contact with the low-pressure lateral face. The first protruding portion protrudes from the main portion and has a shape such that the first protruding portion extends toward the shaft as the first protruding portion extends toward the low-pressure side. The first protruding portion includes a tip that is closest to the low-pressure side in the first protruding portion. The first protruding portion includes a contact region in contact with the shaft, with the seal member being disposed in the seal groove and pressed by the shaft and the groove bottom. The tip is closer to the low-pressure side than the contact region is.

The seal structure can improve the slidability between the seal member and the shaft and reduce the sliding heat between the shaft and the seal member, thus prolonging the life of the seal member.

In the seal structure, in the cross section, the contact region includes an upper-end contact portion that is closest to the high-pressure side in the contact region. In the cross section, the first protruding portion includes a limit. The limit is on a boundary between the main portion and the first protruding portion and closest to the low-pressure lateral face in the boundary. The limit is closer to the low-pressure side than the upper-end contact portion is. The relation of $0.55 \leq X \leq 0.68$ is satisfied where X [mm] denotes a distance between a straight line passing through the upper-end contact portion and orthogonal to the shaft axial direction, and a straight line passing through the limit and orthogonal to the shaft axial direction.

The seal structure can prolong the life of the seal member while ensuring the scalability of the seal member.

In the seal structure, the seal member further includes a second protruding portion protruding from the main portion and in contact with the groove bottom. This can reduce the sliding heat between the shaft and the seal member.

In the seal structure, in the cross section, the main portion is symmetrical in shape with respect to a second center line along the shaft axial direction. The first protruding portion and the second protruding portion are symmetrical to each other in shape with respect to the second center line. This can reduce the manufacturing cost.

Advantageous Effects of Invention

The present invention provides a seal structure that can prolong the life of a seal member.

DESCRIPTION OF EMBODIMENTS

Hereinafter seal structures in embodiments are described with reference to the drawings. In the embodiments described below, identical or substantially identical components are denoted by identical reference signs, and redundant description is not repeated. Any of the components of the embodiments described below may be selectively combined as appropriate.

Embodiment 1

<Bit 2>

Figure 1:
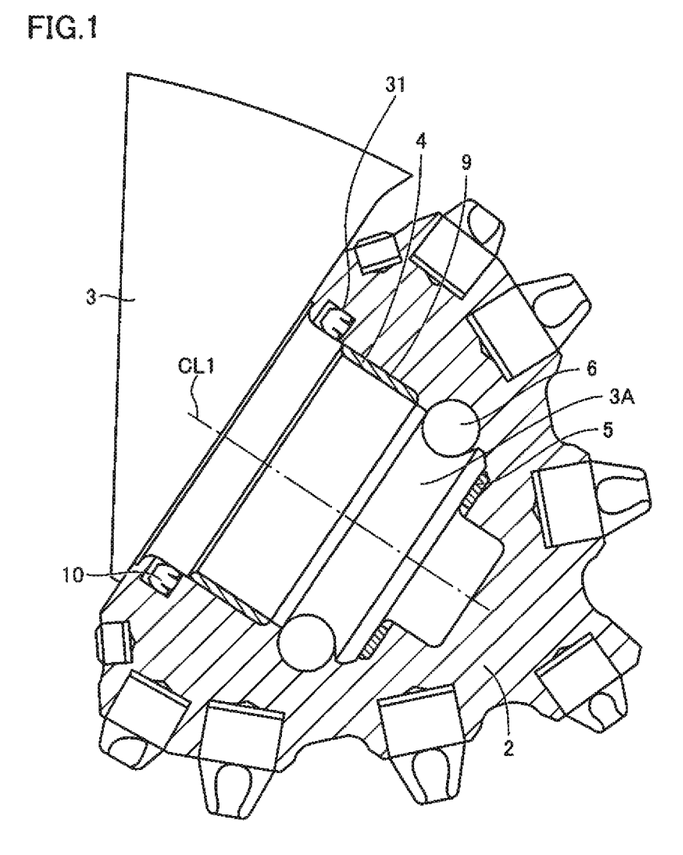
FIG. 1 is a cross-sectional view showing the relationship between a bit and a bit attachment shaft in an excavator.

With reference to FIG. 1, a bit 2 and a bit attachment shaft 3A at an end of an excavator are described, where a seal structure 1 in embodiment 1 is employed. FIG. 1 is a cross-sectional view showing bit 2 and bit attachment shaft 3A in the excavator. Bit 2 is attached to bit attachment shaft 3A on a bit attachment base 3 in such a way that bit 2 is rotatable at high speed. Bit 2 has a cylindrical insertion hole 9. Insertion hole 9 has a spherical bearing 6. Bit attachment shaft 3A is inserted in spherical bearing 6. Between insertion hole 9 and bit attachment shaft 3A, lubricating oil 4, 5 is held.

A seal groove 31 for a seal member 10 to be fitted therein is provided in a region of bit attachment shaft 3A near its base. Seal groove 31 has a ring shape at the inner periphery of insertion hole 9 in bit 2.

Bit 2 employs a so-called down-hole motor (mud motor) mechanism in which bit 2 rotates around the rotation center axis CL1 with the force of muddy water as motive power.

For example, if bit attachment shaft 3A has a diameter of about φ 55 mm, the rotation region of bit 2 can be divided into a low speed rotation region (100 to 200 rpm), a medium-speed rotation region (200 to 500 rpm), and a high-speed rotation region (500 rpm or more). The present embodiment assumes a configuration for a medium-speed rotation region (200 to 500 rpm).

(Seal Member 10)

Figure 2:
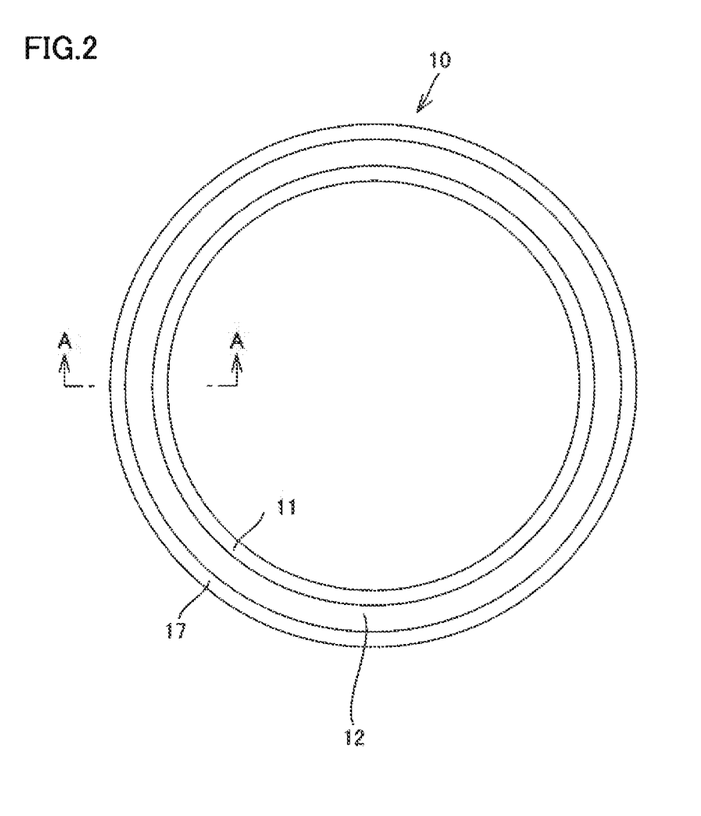
FIG. 2 is a plan view of a seal member to be disposed in a seal groove according to embodiment 1.
Figure 3:
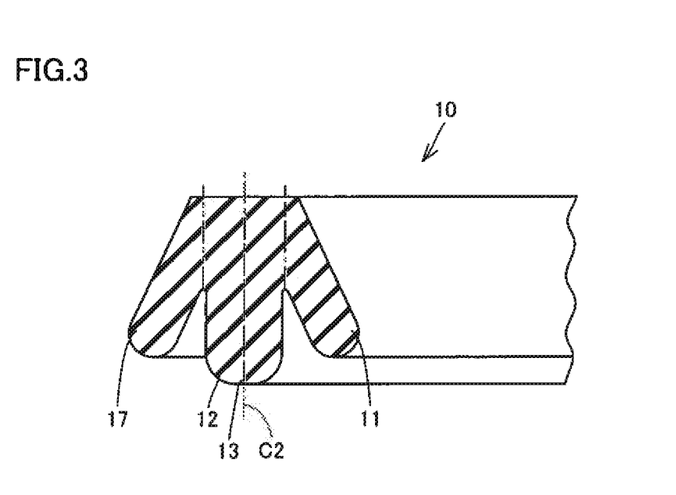
FIG. 3 is a cross-sectional view of the seal member taken along line A-A shown in FIG. 2.

FIG. 2 is a plan view of Seal member 10 to be disposed in seal groove 31 according to embodiment 1. FIG. 3 is a cross-sectional view of seal member 10 taken along line A-A shown in FIG. 2. With reference to FIG. 2 and FIG. 3, seal member 10 is described.

Seal member 10 has a ring shape. Seal member 10 includes a main portion 12, a first protruding portion 11, and a second protruding portion 17. The chain double-dashed lines in FIG. 3 indicate the boundary between main portion 12 and first protruding portion 11, and the boundary between main portion 12 and second protruding portion 17.

In a cross section taken along line A-A, main portion 12 is generally rectangular in shape and symmetrical with respect to second center line C2. Main portion 12 has a bottom face 13. With seal member 10 disposed in seal groove 31, bottom face 13 is in contact with seal groove 31.

First protruding portion 11 and second protruding portion 17 each have a shape protruding from main portion 12. First protruding portion 11 and second protruding portion 17 are symmetrical with respect to second center line C2. The details of first protruding portion 11 and second protruding portion 17 are described later.

Seal member 10 is composed of, for example, hydrogenated nitrile butadiene rubber (HNBR). Instead of HNBR, seal member 10 may be composed of an elastomer material with a nanomaterial added thereto to enhance the properties of the elastomer itself. Seal member 10 has a Shore-A hardness of, for example, 90.

Seal member 10 in embodiment 1 is disposed in seal groove 31 formed in a case 30, at a sliding gap between shaft 20 and case 30 described later.

Figure 4:
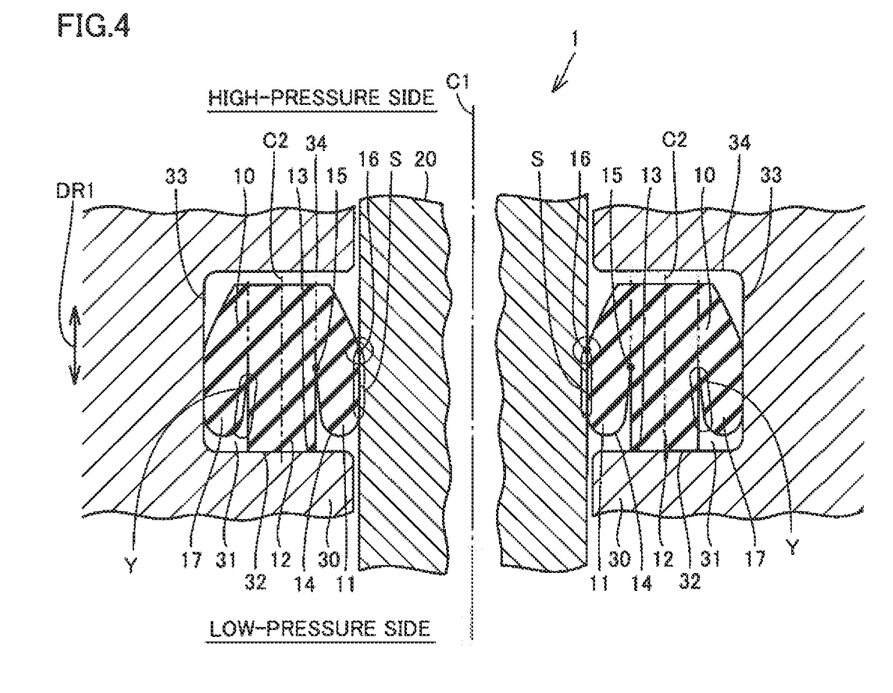
FIG. 4 is a schematic view showing a cross section of a seal s re according to embodiment 1, taken along an imaginary plane in parallel with the shaft axial direction and passing through the center line of the shaft.

FIG. 4 is a schematic view showing a cross section of seal structure 1 according to embodiment 1, taken along an imaginary plane in parallel with shaft axial direction DR1 and passing through center line C1 of shaft 20. In embodiment 1, shaft 20 is bit attachment shaft 3A. In embodiment 1, case 30 is bit 2. Shaft axial direction DR1 is the direction in which shaft 20 extends, i.e., the vertical direction on the FIG. 4 sheet, In the sliding gap between shaft 20 and case 30, the upper side relative to seal groove 31 is a high-pressure side from which muddy water, sand and the like come, and the lower side relative to seal groove 31 is a low-pressure side where spherical bearing 6 is disposed. Seal member 10 separates the high-pressure side from the low-pressure side. Seal member 10 blocks muddy water, sand and the like from entering from the high-pressure side, and minimizes damage to spherical bearing 6.

(Case 30)

Seal groove 31 provided in case 30 has a low-pressure lateral face 32, a high-pressure lateral face 34, and a groove bottom 33. Low-pressure lateral face 32 6 constitutes the lateral face of seal groove 31 on the low-pressure side. In the above-described cross section, low-pressure lateral face 32 extends along a direction orthogonal to shaft axial direction DR1. High-pressure lateral face 34 constitutes the lateral face of seal groove 31 on the high-pressure side. In the above-described cross section, high-pressure lateral face 34 extends along a direction orthogonal to shaft axial direction DR1.

Groove bottom 33 constitutes the bottom face of seal groove 31. Groove bottom 33 extends along shaft axial direction DR1. Groove bottom 33 is connected to high-pressure lateral face 34 at one end of groove bottom 33. Groove bottom 33 is connected to low-pressure lateral face 32 at the other end of groove bottom 33.

Seal member 10 is disposed to be surrounded by shaft 20 and seal groove 31. With seal member 10 disposed in seal groove 31, bottom face 13 of seal member 10 is in contact with low-pressure lateral face 32 of seal groove 31.

(First Protruding Portion 11)

As shown in FIG. 3, when seal member 10 is not disposed in seal groove 31, first protruding portion 11 has a shape such that it extends toward shaft 20 as it extends toward the low-pressure side shown in FIG. 4.

As shown in FIG. 4, with seal member 10 disposed in seal groove 31, first protruding portion 11 is in contact with shaft 20. First protruding portion 11 is pressed by shaft 20.

First protruding portion 11 includes a contact region Sin contact with shaft 20, with seal member 10 disposed in seal groove 31. Contact region S is formed with first protrudportion 11 being pressed by shaft 20. Contact region S includes an upper-end contact portion 16 that is closest to the high-pressure side in contact region S in shaft axial direction DR1. Contact region S extends from upper-end contact portion 16 in the downward direction in FIG. 4.

First protruding portion 11 has a curved tip 14. Tip 14 is closest to the low-pressure side in first protruding portion 11. Tip 14 is closer to the low-pressure side than contact region S is.

First protruding portion 11 includes a limit 15 that is on the boundary between main portion 12 and first protruding portion 11 and closest to low-pressure lateral face 32 in the boundary. Limit 15 is closer to the low-pressure side than contact region S is.

Figure 5:
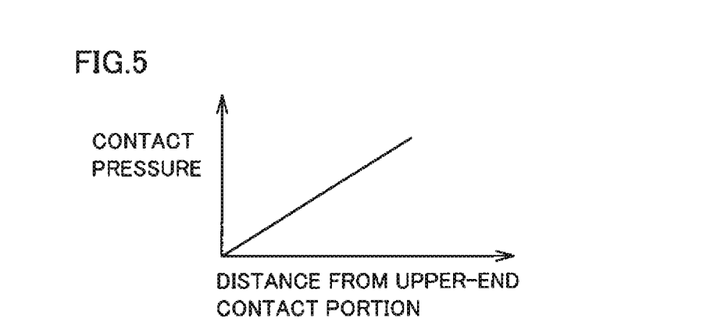
FIG. 5 is a graph schematically showing the distribution of contact pressure in a contact region.

FIG. 5 is a graph schematically showing the distribution of contact pressure in contact region S. The horizontal axis in FIG. 5 represents the distance from upper-end contact portion 16 in the downward direction in FIG. 4. The vertical axis in FIG. 5 represents the contact pressure between first protruding portion 11 and shaft 20.

The origin of the graph corresponds to the position of upper-end contact portion 16, and the distance from upper-end contact portion 16 increases as the location shifts from upper-end contact portion 16 downward in FIG. 4. The contact pressure at upper-end contact portion 16 is 0, and increases with distance from upper-end contact portion 16.

First protruding portion 11 has a shape such that it extends toward shaft 20 as it extends toward the low-pressure side. Accordingly, first protruding portion 11 is bent larger by pressure from shaft 20, as becoming closer to the low-pressure side. A larger bend results in a larger repulsive force with which first protruding portion 11 tends to return to its original shape. Therefore, as first protruding portion 11 becomes closer to the low-pressure side (i.e., as the distance from upper-end contact portion 16 increases), the contact pressure between first protruding portion 11 and shaft 20 increases.

Since the contact pressure is small around upper-end contact portion 16, muddy water enters to around upper-end contact portion 16 from the high-pressure side. However, the contact pressure between shaft 20 and first protruding portion 11 increases as the location shifts from upper-end contact portion 16 to the low-pressure side, until the contact pressure becomes equal to the pressure of the high-pressure side at a certain distance from upper-end contact portion 16. Therefore, the entry of muddy water is minimized at contact region S away from upper-end contact portion 16 by at least the certain distance.

By allowing muddy water to come to a certain position in contact region S (a position within the certain distance from upper-end contact portion 16), the slidability between seal member 10 and shaft 20 can be improved. Further, since muddy water cools seal member 10, the sliding heat between shaft 20 and seal member 10 can be reduced. This can prolong the life of seal member 10.

(Second Protruding Portion 17)

As shown in FIG. 3, when seal member 10 is not disposed in seal groove 31, second protruding portion 17 has a shape such that it extends away from shaft 20 as it extends toward the low-pressure side shown in FIG. 4.

As shown in FIG. 4, with seal member 10 disposed in seal groove 31, second protruding portion 17 is in contact with groove bottom 33. Second protruding portion 17 is pressed by groove bottom 33.

Provision of second protruding portion 17 creates a region Y, thus allowing seal member 10 to move toward groove bottom 33 when seal member 10 is pressed by shall 20.

Allowing clearance for seal member 10 can prevent a too large pressure on seal member 10 from shaft 20. This can reduce the sliding heat between shaft 20 and seal member 10. Thus, the life of seal member 10 can be prolonged.

In embodiment 1, first protruding portion 11 and second protruding portion 17 are symmetrical with respect to second center line C2 along shaft axial direction DR1. In embodiment 1, first protruding portion 11 serves as a seal portion that seals muddy water and the like. Instead, second protruding portion 17 may serve as a seal portion for a seal structure for use in, for example, a piston, since second protruding portion 17 has the same shape as first protruding portion 11.

By designing second protruding portion 17 symmetrically to first protruding portion 11 with respect to second center line C2, seal member 10 can be used in more than one application. Thus, the manufacturing cost can be reduced.

Embodiment 2

Figure 6:
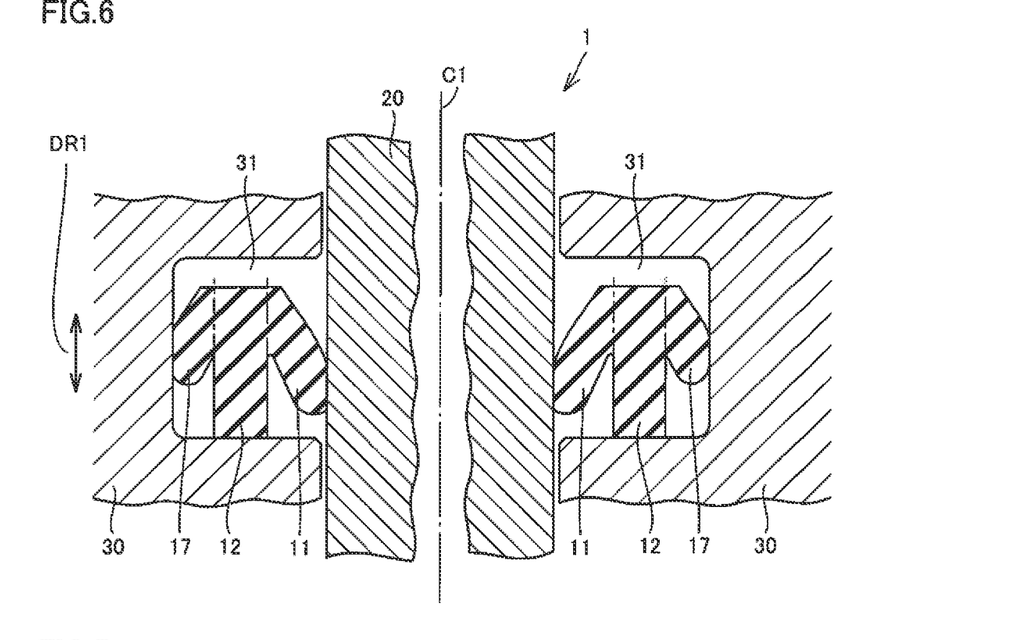
FIG. 6 is a schematic view showing a cross section of a seal structure according to embodiment 2, taken along an imaginary plane in parallel with the shaft axial direction and passing through the center line of the shaft.

FIG. 6 is a schematic view showing a cross section of seal structure 1 according to embodiment 2, taken along an imaginary plane in parallel with shaft axial direction DR1 and passing through center line C1 of shaft 20. Unlike embodiment 1, second protruding portion 17 according to embodiment 2 is not axisymmetric to first protruding portion 11.

Like seal member 10 according to embodiment 1, seal member 10 according to embodiment 2 can also improve the slidability between shaft 20 and seal member 10 and reduce the sliding heat by cooling seal member 10, thus advantageously prolonging the life of seal member 10.

Embodiment 3

Figure 7:
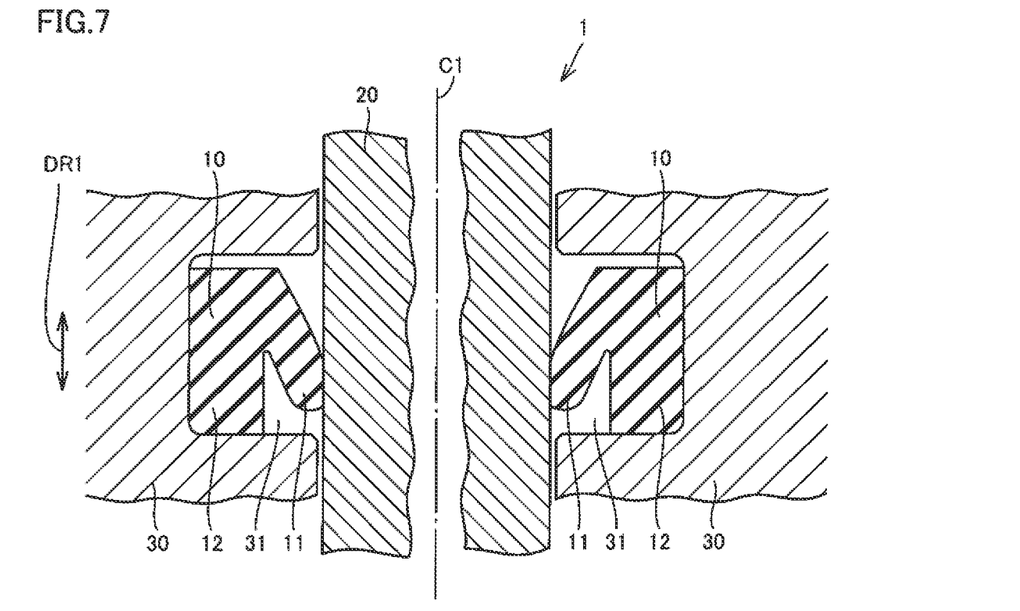
FIG. 7 is a schematic view showing a cross section of a seal structure according to embodiment 3, taken along an imaginary plane in parallel with the shaft axial direction and passing through the center line of the shaft.

FIG. 7 is a schematic view showing a cross section of seal structure 1 according to embodiment 3, taken along an imaginary plane in parallel with shaft axial direction DR1 and passing through center line C1 of shaft 20. Unlike embodiment 1, no second protruding portion 17 is provided.

Like seal member 10 according to embodiment 1, seal member 10 according to embodiment 3 can also improve the slidability between shaft 20 and seal member 10 and reduce the sliding heat by cooling seal member 10, thus advantageously prolonging the life of seal member 10.

Examples

By conducting studies, the inventors have found that the relationship between the dimensions of seal member 10 and the dimensions of seal groove 31 greatly affects the sealability and the life of seal member 10. Various seal members 10 having different dimensions were used and the performances of the seal members 10 were evaluated.

Figure 8:
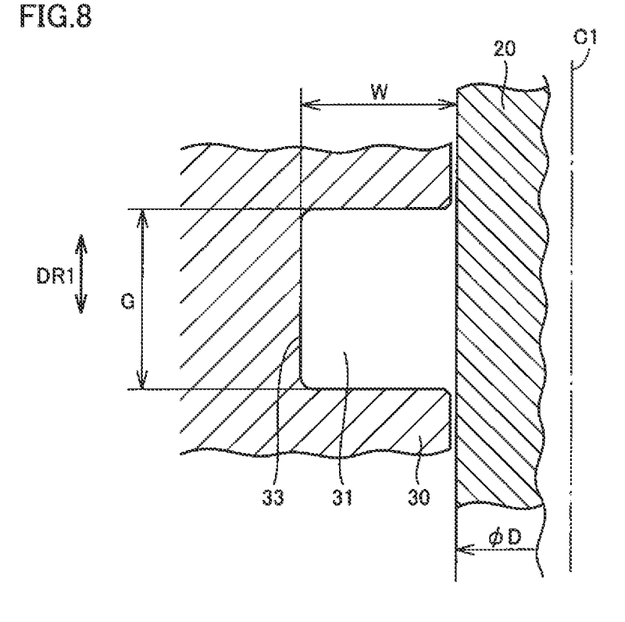
FIG. 8 is a schematic view showing the dimensions of a seal groove and a shaft in a cross section of a seal structure according to embodiment 1, taken along an imaginary plane in parallel with the shaft axial direction and passing through the center line of the shaft.

FIG. 8 is a schematic view showing the dimensions of seal groove 31 and shaft 20 in a cross section of seal structure 1 according to embodiment 1, taken along an imaginary plane in parallel with shaft axial direction DR1 and passing through center line C1 of shaft 20. The length from groove bottom 33 to shaft 20 is denoted by W [mm], the length of groove bottom 33 in shaft axial direction DR1 is denoted by [mm], and the diameter of shaft 20 is denoted by D [mm].

Figure 9:
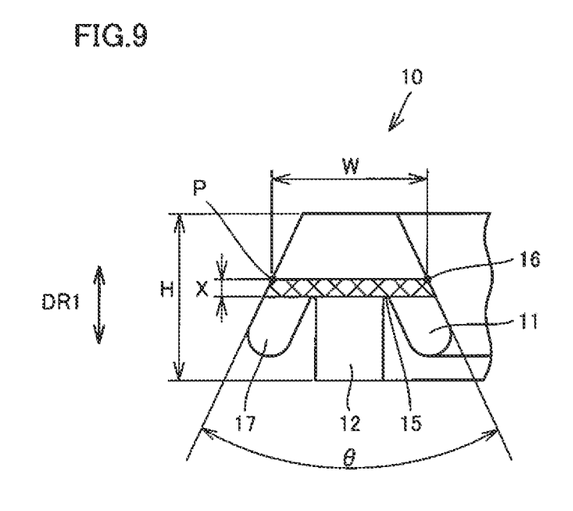
FIG. 9 is a schematic view showing the dimensions of a seal member in a cross section of a seal structure according to embodiment 1, taken along an imaginary plane in parallel with the shaft axial direction and passing through the center line of the shaft.

FIG. 9 is a schematic view showing the dimensions of seal member 10 in a cross section of seal structure 1 according to embodiment 1, taken along an imaginary plane in parallel with shaft axial direction DR1 and passing through center line C1 of shaft 20. The distance between the straight line passing through upper end contact portion 16 and orthogonal to shaft axial direction DR1, and the straight line passing through limit 15 and orthogonal to shaft axial direction DR1 is denoted by X [mm]. The height of seal member 10 in shaft axial direction DR1 is denoted by H [mm], and the angle formed by the direction in which first protruding portion 11 extends and the direction in which second protruding portion 17 extends is denoted by θ [°].

Length W from point P to upper-end contact portion 16 in shaft axial direction DR1 corresponds to W shown in FIG. 8, where point P is the point at which the straight line passing through upper-end contact portion 16 and orthogonal to shaft axial direction DR1 intersects with second protruding portion 17. The smaller W is, the larger X is. X depends on W.

With seal member 10 according to embodiment 1, evaluation was made for the heat generation, the wear resistance, the scalability, and the seal life of seal member 10, with respect to various seal members 10 having different dimensions (examples 1 to 3 and comparative example 1). The excellent level is denoted by "excellent", the acceptable level is denoted by "acceptable", and the poor level is denoted by "poor".

(Evaluation Results)

Figure 10:
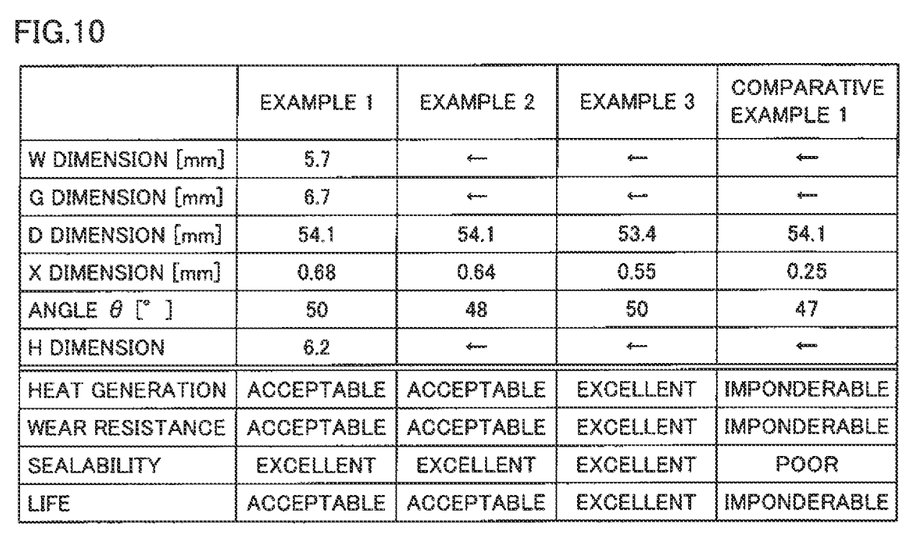
FIG. 10 is a table showing the evaluation results for various seal members.

FIG. 10 is a table showing the evaluation results for various seal members 10. X is associated with the length of contact region S. The larger X is, the longer the length of contact region S is. A longer length of contact region S provides better scalability of seal member 10. Seal members 10 in examples 1 to 3 each had contact region S having a length long enough (having X large enough), and thus their sealability are evaluated as "excellent".

Seal member 10 in comparative example 1 had contact region S having a short length (small X), and thus its sealability is evaluated as "poor". Seal member 10 in comparative example 1 caused a leakage at an early stage from the start of evaluation. Accordingly, its heat generation, wear resistance, and seal life are impossible to evaluate and thus determined to be "imponderable".

A longer length of contact region S (larger X) improves the scalability, but causes greater sliding heat between shaft 20 and first protruding portion 11, thus resulting in shorter life of seal member 10. When example 3 is compared with example 1, X of seal member 10 in example 3 is smaller than X of seal member 10 in example 1. Accordingly, seal member 10 in example 3 is evaluated as better than seal member 10 in example 1 in seal life.

FIG. 10 shows that seal member 10 having dimension X of 0.55≤X≤0.68 has a prolonged life while ensuring the sealability.

By appropriately setting the dimensions of seal member 10 and the dimensions of seal groove 31, provided is seal structure 1 that can prolong the life of seal member 10 while ensuring the sealability.

Although tip 14 in embodiments 1 to 3 is curved, the curved shape is not mandatory.

It should be understood that the embodiments and examples disclosed herein a by way of example in every respect, not by way of limitation. The scope of the present invention is defined not by the above description but by the terms of the claims, and is intended to include any modification within the meaning and scope equivalent to the terms of the claims.

REFERENCE SIGNS LIST

1: seal structure; 10: seal member; 11: first protruding portion; 12: main portion; 13: bottom face; 14: tip; 15: limit; 16: upper-end contact portion; 17: second protruding portion; 20: shaft; 30: case; 31: seal groove; 32: low-pressure lateral face; 33: groove bottom; 34: high-pressure lateral face; S: contact region; DR1: shaft axial direction; C1 center line; C2: second center line

The invention claimed is:

1. A seal structure comprising a ring-shaped seal member disposed in a seal groove formed in a case at a sliding gap between a shaft and the case, the seal member separating a high-pressure side from a low-pressure side,
the case including
a low-pressure lateral face constituting a lateral face of the seal groove on the low-pressure side, and extending along a direction orthogonal to a shaft axial direction of the shaft in a cross section of the seal structure, the cross section being taken along an imaginary plane in parallel with the shaft axial direction and passing through a center line of the shaft, and
a groove bottom constituting a bottom face of the seal groove, and extending along the shaft axial direction in the cross section,
the seal member including
a main portion including a bottom face in contact with the low-pressure lateral face,
a first protruding portion protruding from the main portion and having a shape such that the first protruding portion extends toward the shaft as the first protruding portion extends toward the low-pressure side,
the first protruding portion including a tip that is closest to the low-pressure side in the first protruding portion,
the first protruding portion including a contact region in contact with the shaft, with the seal member being disposed in the seal groove and pressed by the shaft and the groove bottom,
the tip being closer to the low-pressure side than the contact region is, and
a second protruding portion in contact with the bottom groove,
the contact region of the first protruding portion includes an upper-end contact portion that is closest to the high-pressure side in the contact region,
the first protruding portion includes a limit that is on a boundary between the main portion and the first protruding portion and is closest to the low-pressure lateral face in the boundary,
the limit is closer to the low-pressure side than the upper-end contact portion, and
0.55≤X≤0.68 is satisfied where X [mm] denotes a distance between a straight line passing through the upper-end contact portion and orthogonal to the shaft axial direction, and a straight line passing through the limit and orthogonal to the shaft axial direction.

2. The seal structure according to claim 1, wherein
in the cross section, the main portion is symmetrical in shape with respect to a second center line along the shaft axial direction, and
the first protruding portion and the second protruding portion are symmetrical to each other in shape with respect to the second center line.

* * * * *